UNITED STATES PATENT OFFICE.

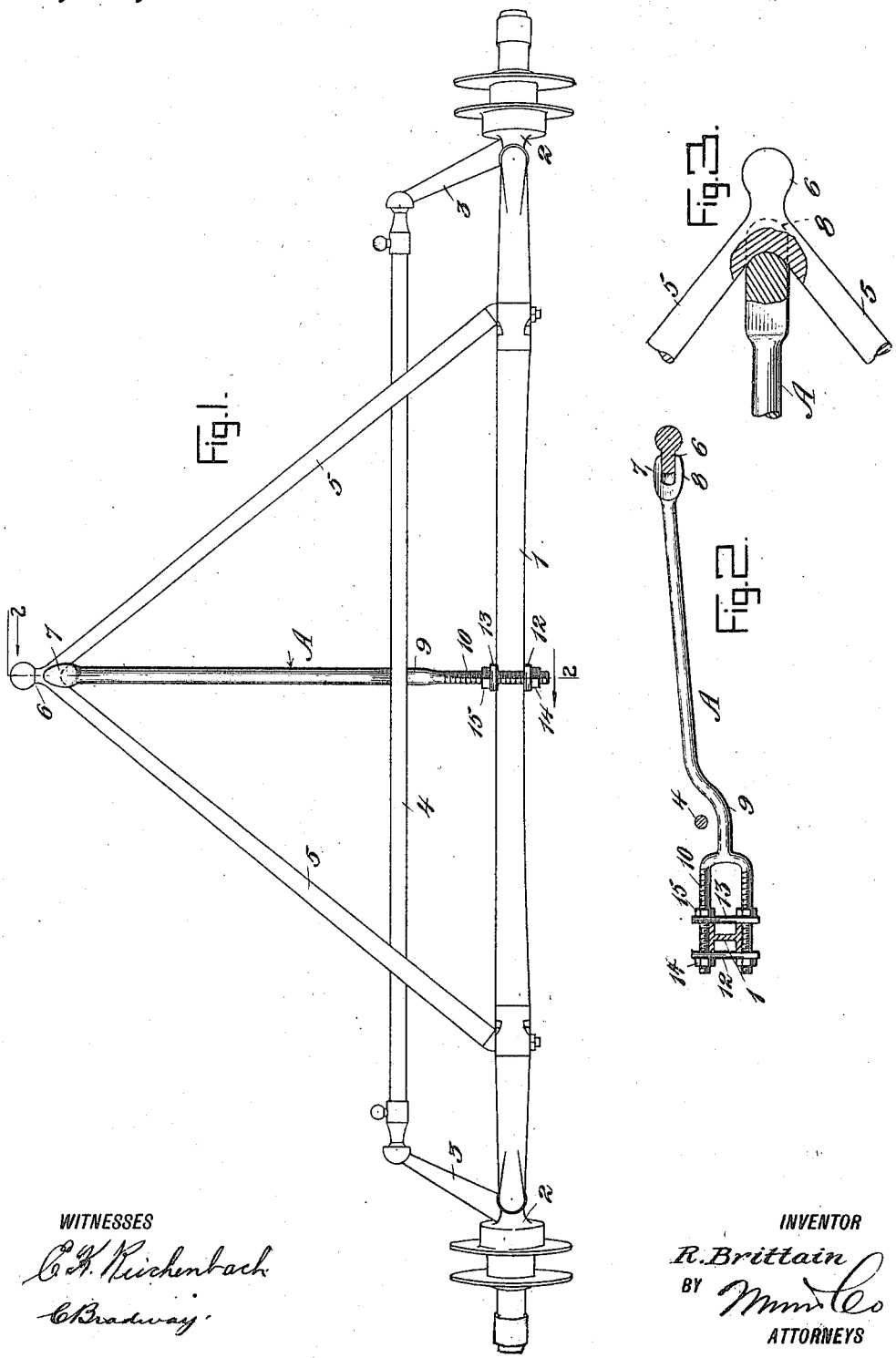

ROBERT BRITTAIN, OF DOWNSVILLE, NEW YORK.

FRONT-AXLE BRACE.

1,221,665.  Specification of Letters Patent.  Patented Apr. 3, 1917.

Application filed October 10, 1916. Serial No. 124,787.

*To all whom it may concern:*

Be it known that I, ROBERT BRITTAIN, a citizen of the United States, and a resident of Downsville, in the county of Delaware and State of New York, have invented a new and Improved Front-Axle Brace, of which the following is a full, clear, and exact description.

This invention relates to vehicle construction and has to deal particularly with a supplemental brace for the front axle of an automobile.

The invention has for its principal object to provide a brace rod especially adapted for a Ford automobile for use in connection with the front axle and the rearwardly converging radius rods or V-frame extending between the axle and the engine, whereby the front end of the chassis is stiffened and made firmer, the wear on the hangers and bushings minimized and equalized, the bending of the radius rods prevented, and with the general result that the car steers better and more easily and safely.

A more specific object of the invention is the provision of a supplemental brace rod having a yoke at its front end which clamps to the center of the front axle, and a crotched rear end which engages the vertex or angle at the rear ends of the radius rods, the brace rods serving as an attachment which is easily and quickly applied to cars already in use.

With such objects in view, and others which will appear as the description proceeds, the invention comprises various novel features of construction and arrangement of parts which will be set forth with particularity in the following description and claims appended hereto.

In the accompanying drawing, which illustrates one embodiment of the invention and wherein similar characters of reference indicate corresponding parts in all the views, Figure 1 is a plan view of the front axle, steering connections and radius rods of a Ford chassis with the invention applied thereto;

Fig. 2 is a sectional view on the line 2—2, Fig. 1, with a supplemental brace rod in elevation; and Fig. 3 is a plan view of the end of the brace rod and of the radius rods, with portions broken away.

Referring to the drawing, 1 designates the front axle of the automobile, 2 the swinging stub axles, 3 the steering arms of the axles, 4 the steering connecting bar, 5 the radius rods and 6 the head at the rear ends of the radius rods which is connected with the engine of the automobile. These parts are of standard construction so that a detailed description is unnecessary. The supplemental brace rod A comprises a bar of metal which has its rear end bifurcated to form upper and lower members 7 and 8 which embrace the coupling heads 6 which unite the rear ends of the radius rods 5. The brace A, which is disposed at right-angles to the axis 1, has a drop 9 so as to pass under the steering bar 4, and forward of this drop the brace A is bifurcated and the upper and lower members 10 and 11 extend over the top and under the bottom of the axle. These members 10 and 11 are threaded, and on them are vertical clamping bars 12 and 13 which engage the front and rear sides of the axle, these clamping bars being clamped in position by nuts 14 and 15 on the members 10 and 11.

In positioning the supplemental brace rod A the nuts 14 and clamping member 12 are removed and the nuts 15 are run backwardly on the members 10 and 11, so that the said members can engage forwardly over the axle 1 a sufficient distance to enable the bifurcated rear end of the rod to be engaged with the coupling element 6, and then the nuts 15 are turned so as to engage the bar 13 with the rear side of the axle, thereby forcing the rear end of the brace rod firmly home with respect to the rear ends of the radius rods, and then the clamping bar 12 is placed on the members 10 and 11 and the nuts 14 applied to firmly clamp the brace rod on the axle.

From the foregoing description taken in connection with the accompanying drawing, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative and that such changes may be made when desired as fall within the scope of the appended claims.

Having thus described my invention, I claim as new and desire to secure by Letters Patent:

1. A front axle brace rod attachment for automobiles, comprising a single-piece member in the form of a rod having bifurcated front and rear ends, the front bifurcations being provided with axle-engaging clamping members, there being a drop in the bar immediately behind the front bifurcations.

2. A brace attachment of the class described comprising a rod having its rear end formed with upper and lower bifurcations and its front end formed with upper and lower threaded bifurcations, clamping pieces on the threaded bifurcations for engaging an axle, and nuts on the threaded bifurcations for clamping the said pieces to the axle.

ROBERT BRITTAIN.